US012401150B2

(12) United States Patent
Fu et al.

(10) Patent No.: US 12,401,150 B2
(45) Date of Patent: Aug. 26, 2025

(54) ELECTRICAL CONNECTOR HAVING FOUR TERMINAL MODULES AND A PAIR OF METALLIC SIDE PLATES FIXING THE FOUR TERMINAL MODULES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Dai-Pei Fu, Kunshan (CN); Chun-Hsiung Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 335 days.

(21) Appl. No.: 18/129,852

(22) Filed: Apr. 1, 2023

(65) Prior Publication Data

US 2023/0335934 A1 Oct. 19, 2023

(30) Foreign Application Priority Data

Apr. 15, 2022 (CN) ......................... 202220874303.6

(51) Int. Cl.

| | |
|---|---|
| ***H01R 13/40*** | (2006.01) |
| ***H01R 13/405*** | (2006.01) |
| ***H01R 13/516*** | (2006.01) |
| ***H01R 13/6471*** | (2011.01) |
| ***H01R 24/60*** | (2011.01) |

(52) U.S. Cl.
CPC ......... *H01R 13/405* (2013.01); *H01R 13/516* (2013.01); *H01R 13/6471* (2013.01); *H01R 24/60* (2013.01)

(58) Field of Classification Search
CPC . H01R 13/514; H01R 13/518; H01R 13/6471
USPC ............................................ 439/60, 79, 637
See application file for complete search history.

(56) References Cited

U.S. PATENT DOCUMENTS

| | | | |
|---|---|---|---|
| 8,764,460 | B2 | 7/2014 | Smink |
| 8,764,464 | B2 | 7/2014 | Buck et al. |
| 9,692,183 | B2 | 6/2017 | Phillips et al. |
| 9,759,879 | B1 | 9/2017 | Takai et al. |
| 9,768,557 | B2 | 9/2017 | Phillips et al. |
| 9,837,740 | B2 | 12/2017 | Liao |
| 10,367,308 | B2 | 7/2019 | Little et al. |
| 10,396,513 | B2 | 8/2019 | Regnier |

(Continued)

*Primary Examiner* — Phuong K Dinh
(74) *Attorney, Agent, or Firm* — Ming Chieh Chang

(57) ABSTRACT

An electrical connector including: an insulative housing; four terminal modules received in the insulative housing and each having a row of terminals integrally formed with plural plastic fixing members, each terminal defining a contact portion, a tail portion opposite to the contact portion, and a holding portion therebetween; and a pair of metallic side plates fixing the four terminal modules together, each metallic side plates having plural holes, each plastic fixing member including a pair of positioning protrusions at two ends thereof to be received within corresponding holes, wherein the positioning protrusions respectively extend through the corresponding holes and are heat riveted to the metallic side plates.

12 Claims, 14 Drawing Sheets

(56) References Cited

U.S. PATENT DOCUMENTS

| | | | | |
|---|---|---|---|---|
| 10,581,201 | B2 * | 3/2020 | Hsu | H01R 13/405 |
| 11,043,780 | B2 | 6/2021 | Wang | |
| 11,316,304 | B2 * | 4/2022 | Chen | H01R 13/6471 |
| 11,322,869 | B2 | 5/2022 | Phillips et al. | |
| 2014/0127946 | A1 | 5/2014 | Ito et al. | |
| 2018/0115119 | A1 * | 4/2018 | Little | H01R 4/2404 |
| 2019/0008910 | A1 | 1/2019 | Liu-Walsh et al. | |
| 2021/0328384 | A1 | 10/2021 | Avery et al. | |
| 2022/0021158 | A1 | 1/2022 | Little et al. | |
| 2022/0320786 | A1 | 10/2022 | Little et al. | |
| 2022/0352675 | A1 | 11/2022 | Zerebilov et al. | |

* cited by examiner

ELECTRICAL CONNECTOR HAVING FOUR TERMINAL MODULES AND A PAIR OF METALLIC SIDE PLATES FIXING THE FOUR TERMINAL MODULES

BACKGROUND OF THE INVENTION

Field of the Invention

The present invention relates generally to an electrical connector, and particularly to an electrical connector including four terminal modules secured by a pair of metal side plates.

Description of Related Arts

US Patent Application Publication No. 20210328384 discloses an electrical connector comprising a four terminal modules and a pair of metallic side plate for fixes the four terminal modules, each metallic side plates forms a plurality of apertures therein, and each terminal module includes positioning protrusions to be received within the corresponding apertures. However, the positioning protrusions and the aperture create an interference fit/compression fit force, and it requires high precision to match, and more complicated to assemble and the fix is not stable.

An improved electrical connector is desired.

SUMMARY OF THE INVENTION

The objective of the present invention is to provide an electrical connector including four terminal modules that is easy to assemble.

To achieve the above object, an electrical connector comprises: an insulative housing; a first terminal module and a second terminal module arranged vertically in the insulative housing, and a third terminal module and a fourth terminal module arranged vertically in the insulative housing, the first terminal module including a first row of terminals integrally formed with a plurality of plastic fixing members extending in a transverse direction perpendicular to the vertical direction, the second terminal module including a second row of terminals integrally formed with a plurality of transversely extending plastic fixing members via insert-molding, the third terminal module including a third row of terminals integrally formed with a plurality of transversely extending plastic fixing members via insert-molding, the fourth terminal module including a fourth row of terminals integrally formed with a plurality of transversely extending plastic fixing members via insert-molding, each terminal defining a contact portion matched with a mating connector, a tail portion opposite to the contact portion, and a holding portion therebetween; and a pair of metallic side plates fixing the four terminal modules together, each metallic side plates having a plurality of holes, each plastic fixing member including a pair of positioning protrusions at two ends thereof in the transverse direction to be received within corresponding holes, respectively, wherein the positioning protrusions respectively extend through the corresponding holes and are heat riveted to the metallic side plates.

Compared to prior art, in the electrical connector of the present invention, the positioning protrusions of each terminal module are respectively passed through the corresponding holes and secured to the metallic side plate by heat riveting. Therefore, the assembly is simple and stable and the requirements for matching accuracy are lower.

DETAILED DESCRIPTION OF THE PREFERRED EMBODIMENT

Figure 1:
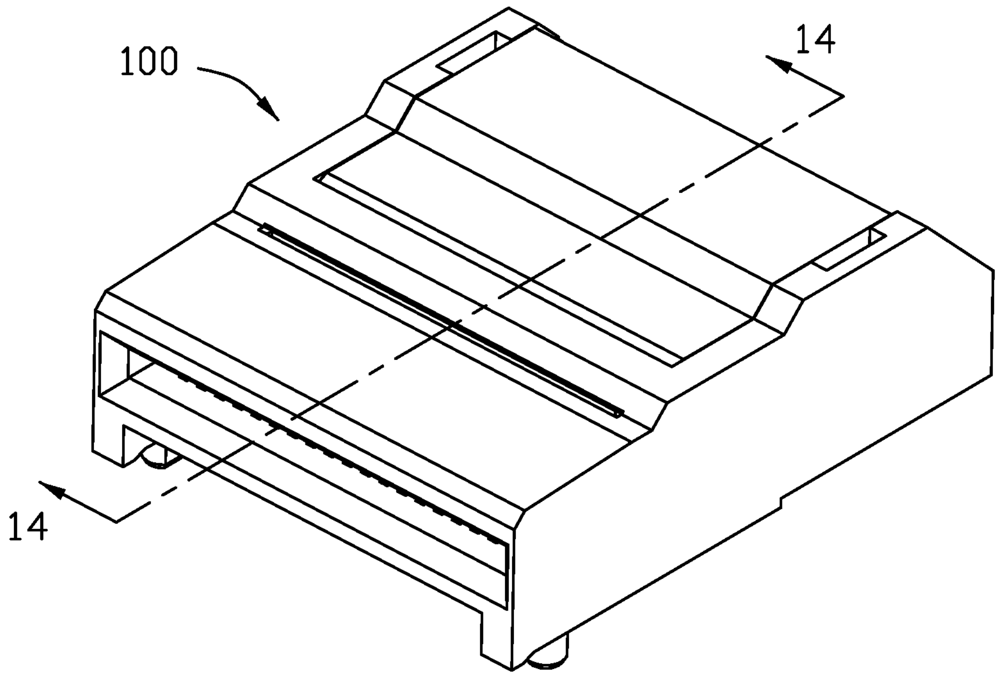
FIG. 1 is a perspective view of an electrical connector according to the first invention.
Figure 2:
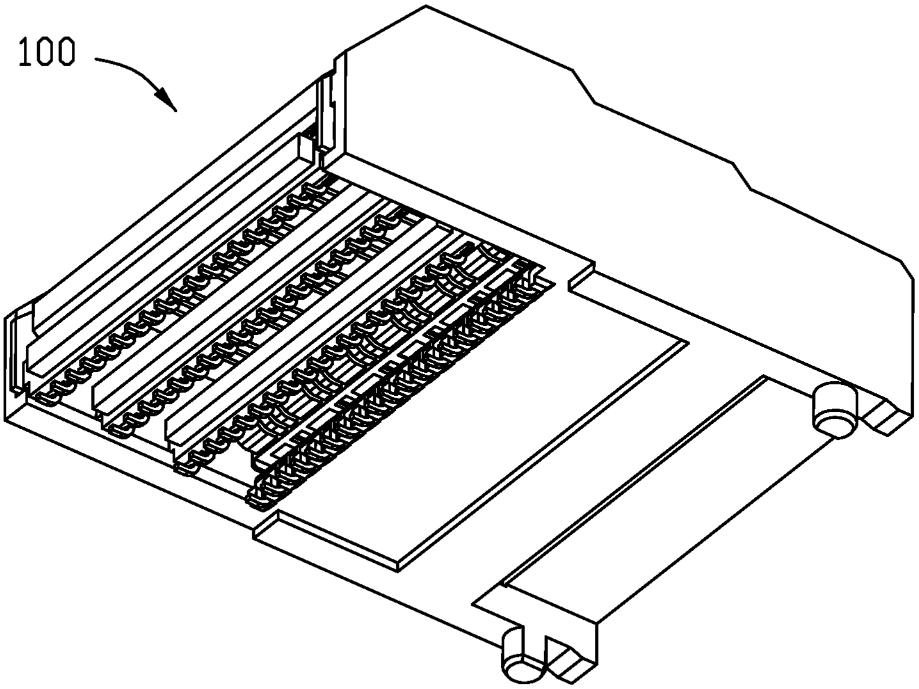
FIG. 2 is another perspective view of the electrical connector of FIG. 1.
Figure 3:
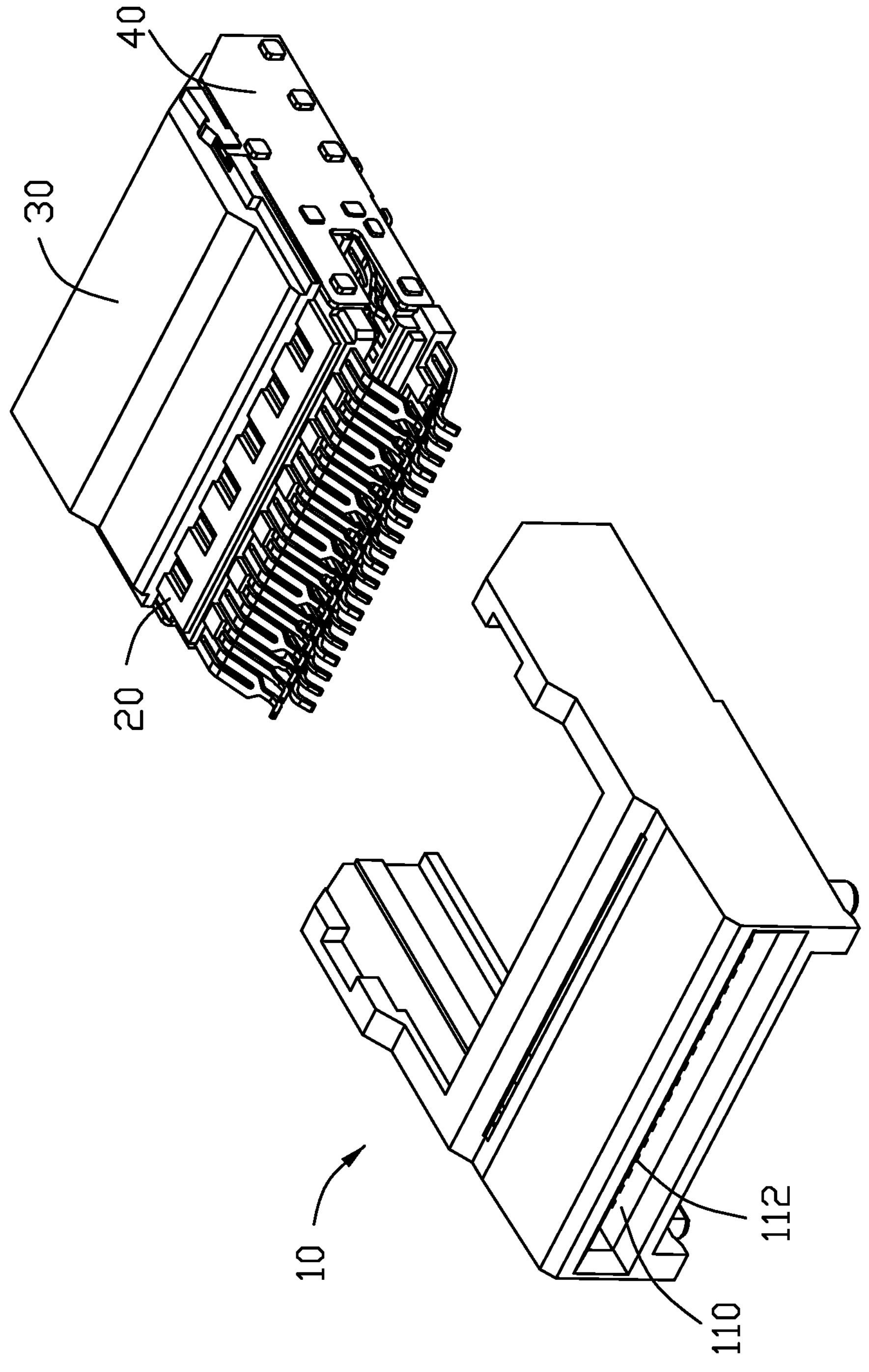
FIG. 3 is an exploded perspective view of the electrical connector of FIG. 1.
Figure 4:
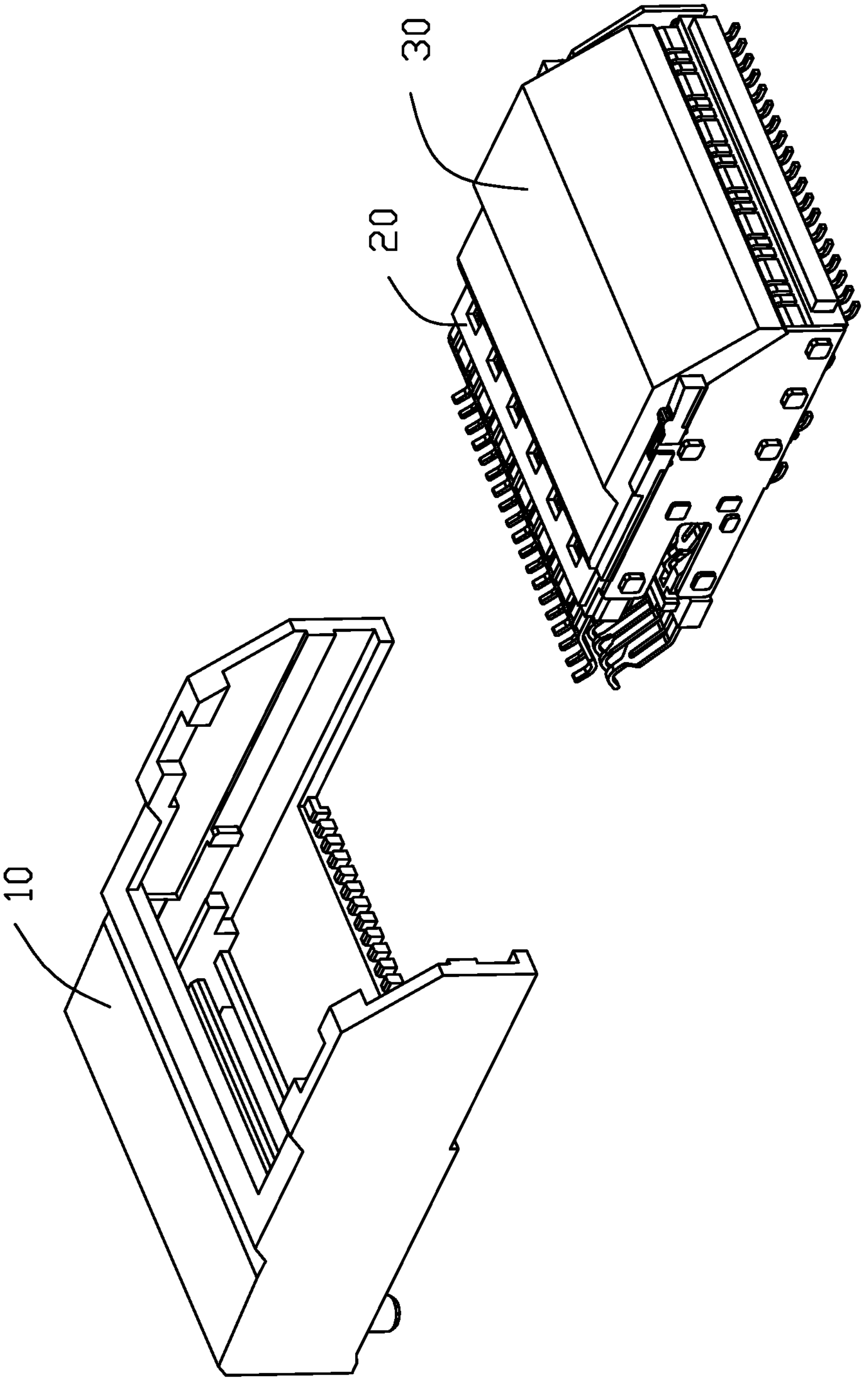
FIG. 4 is another exploded perspective view of the electrical connector of FIG. 3.
Figure 5:
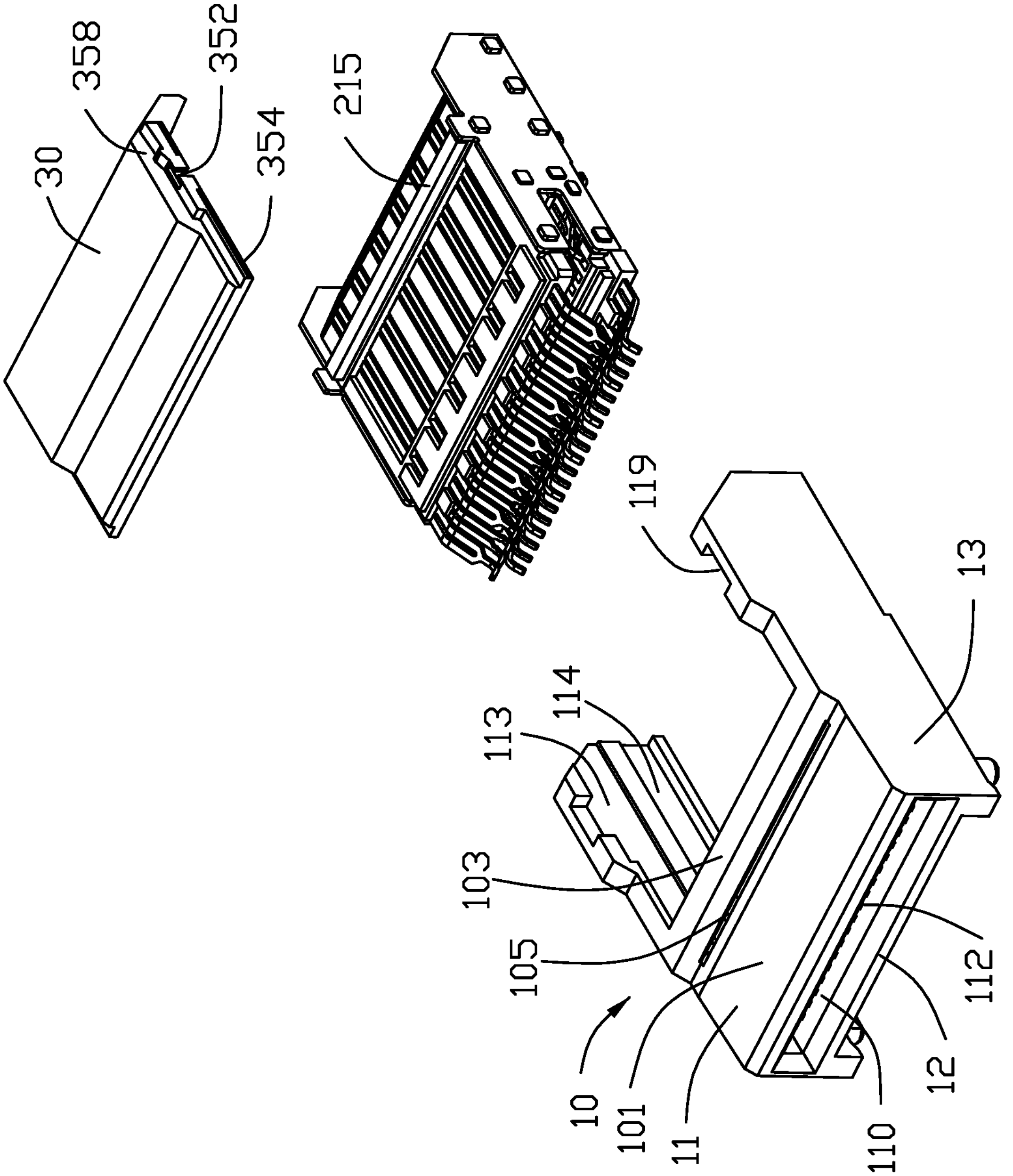
FIG. 5 is a further exploded perspective view of the electrical connector of FIG. 3.
Figure 6:
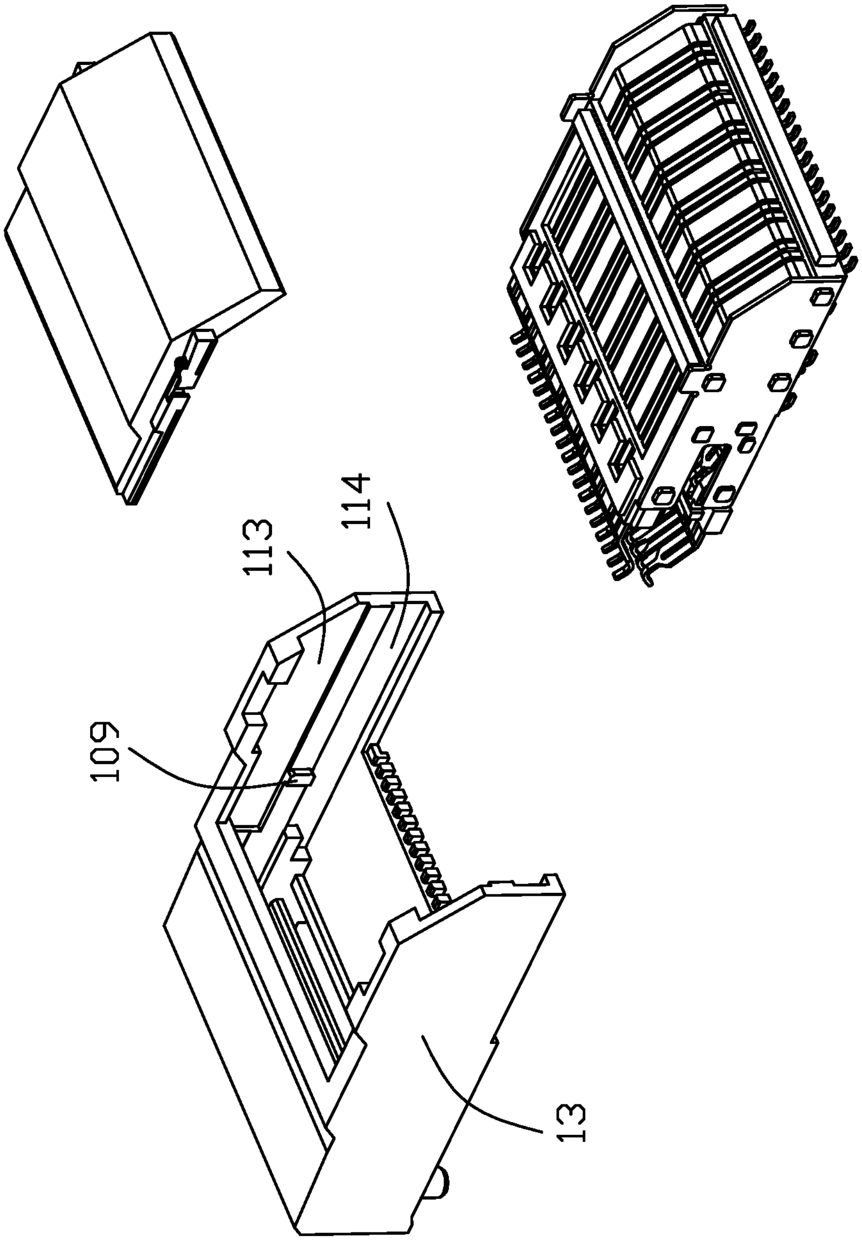
FIG. 6 is another exploded perspective view of the electrical connector of FIG. 5.
Figure 7:
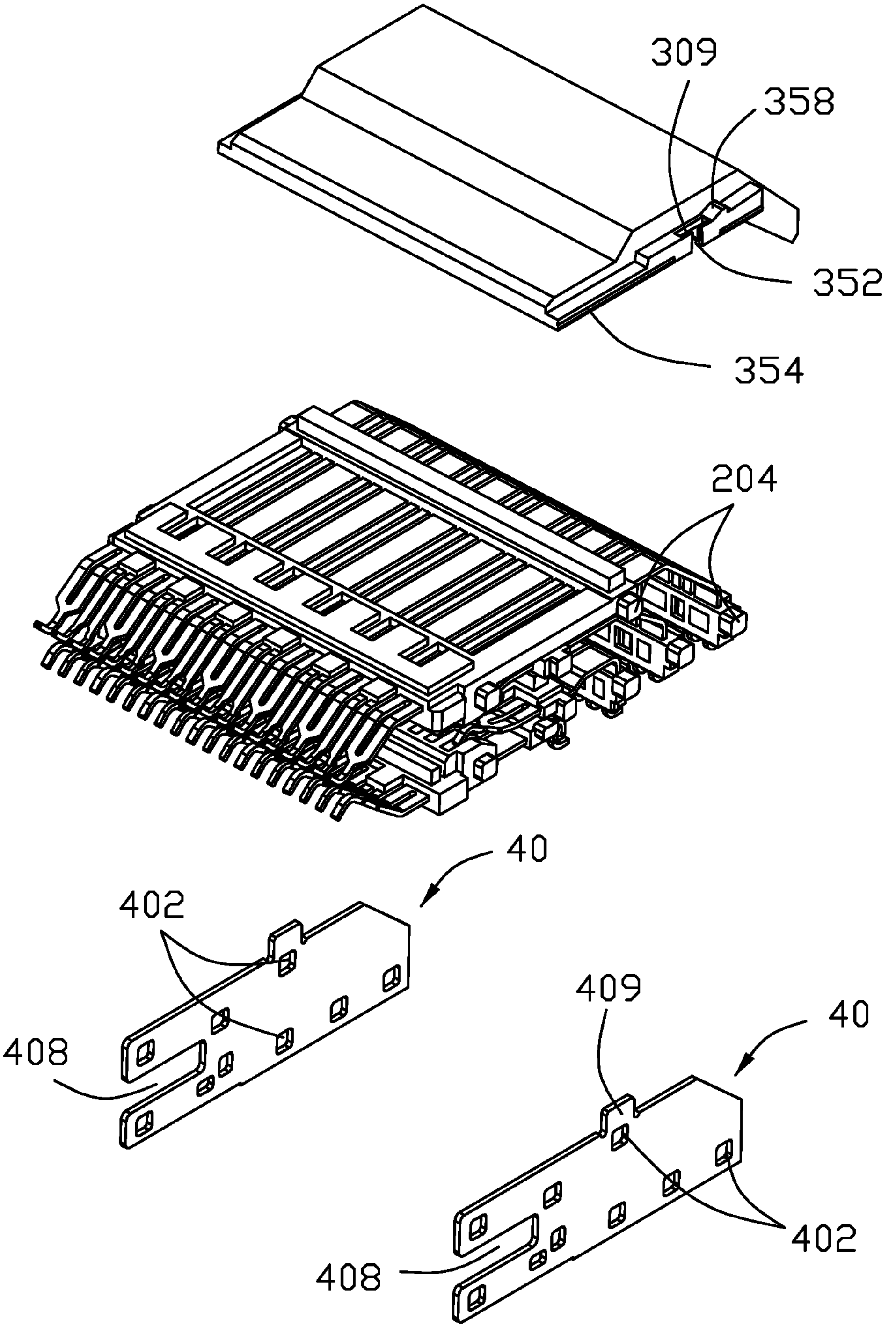
FIG. 7 is an exploded perspective view of the electrical connector of FIG. 6 without showing the insulative housing.
Figure 8:
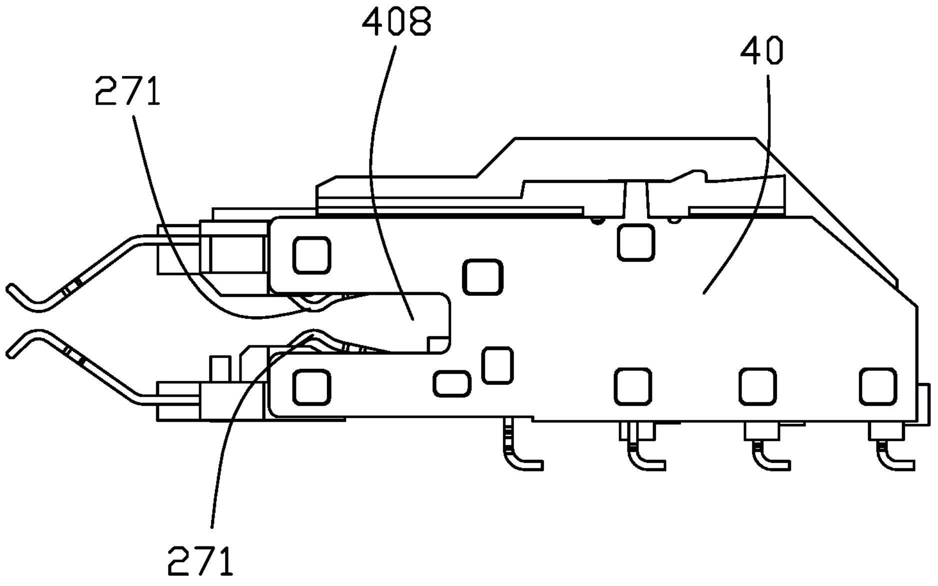
FIG. 8 is a side view of the electrical connector of FIG. 7 without showing the insulative housing.
Figure 9:
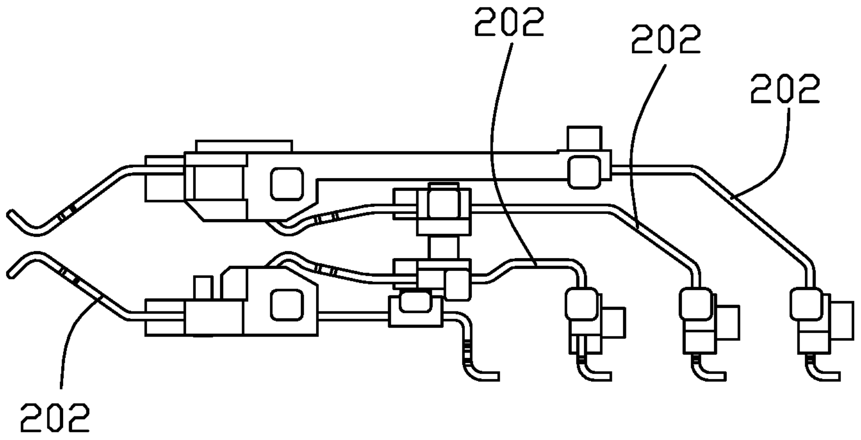
FIG. 9 is a side view of the terminal module of the electrical connector of FIG. 7.
Figure 10:
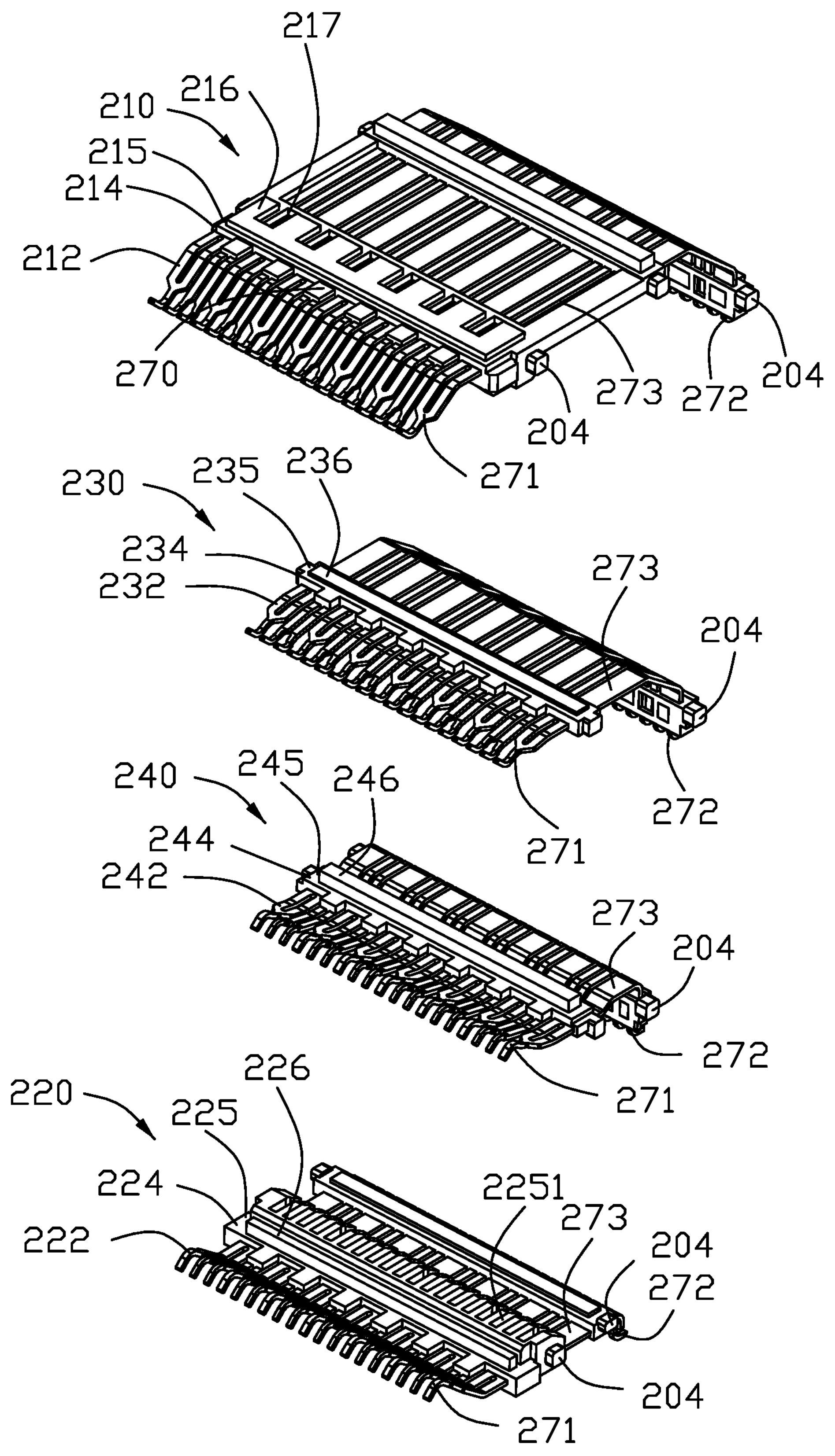
FIG. 10 is perspective view of the terminal module of the electrical connector of FIG. 7.
Figure 11:
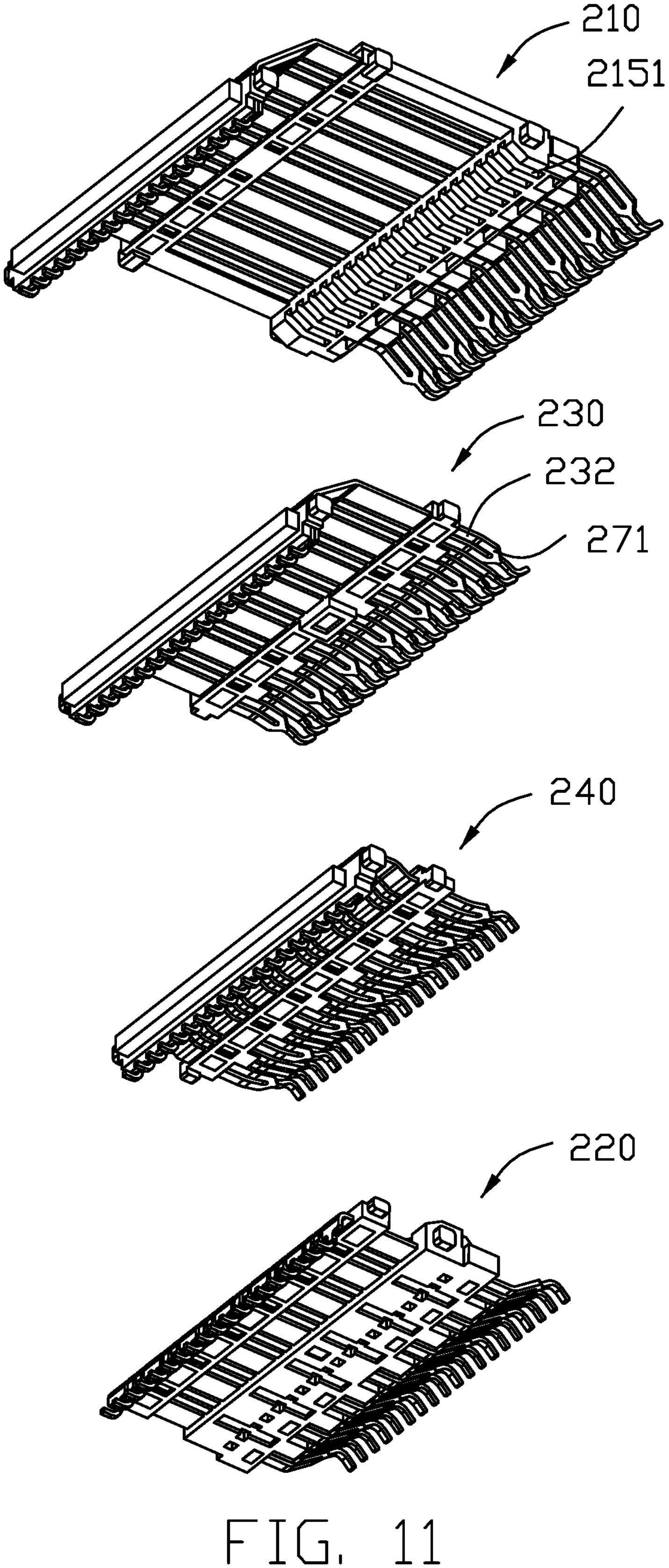
FIG. 11 is another perspective view of the terminal module of the electrical connector of FIG. 10.
Figure 12:
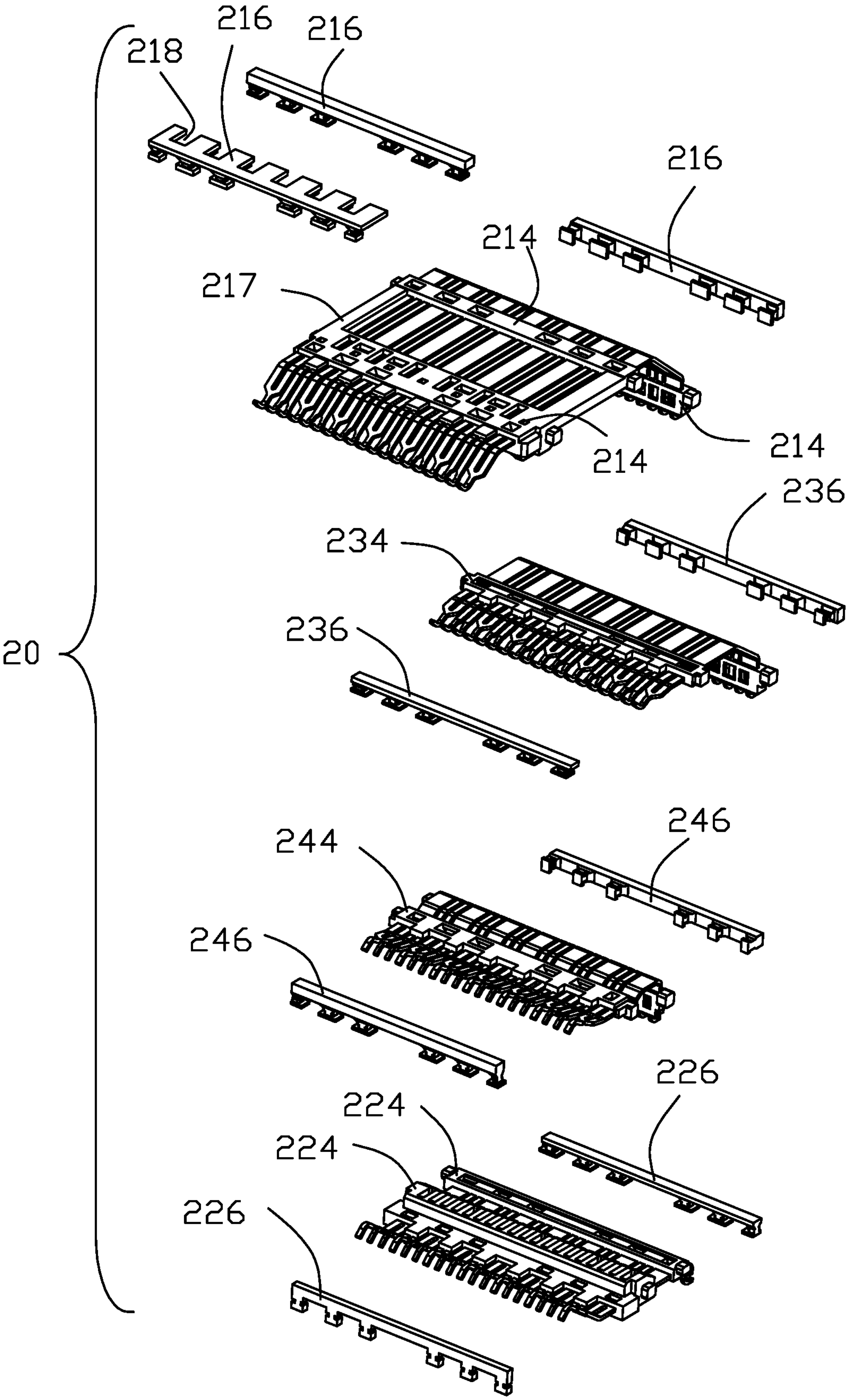
FIG. 12 is a exploded perspective view of the terminal module of FIG. 10.
Figure 13:
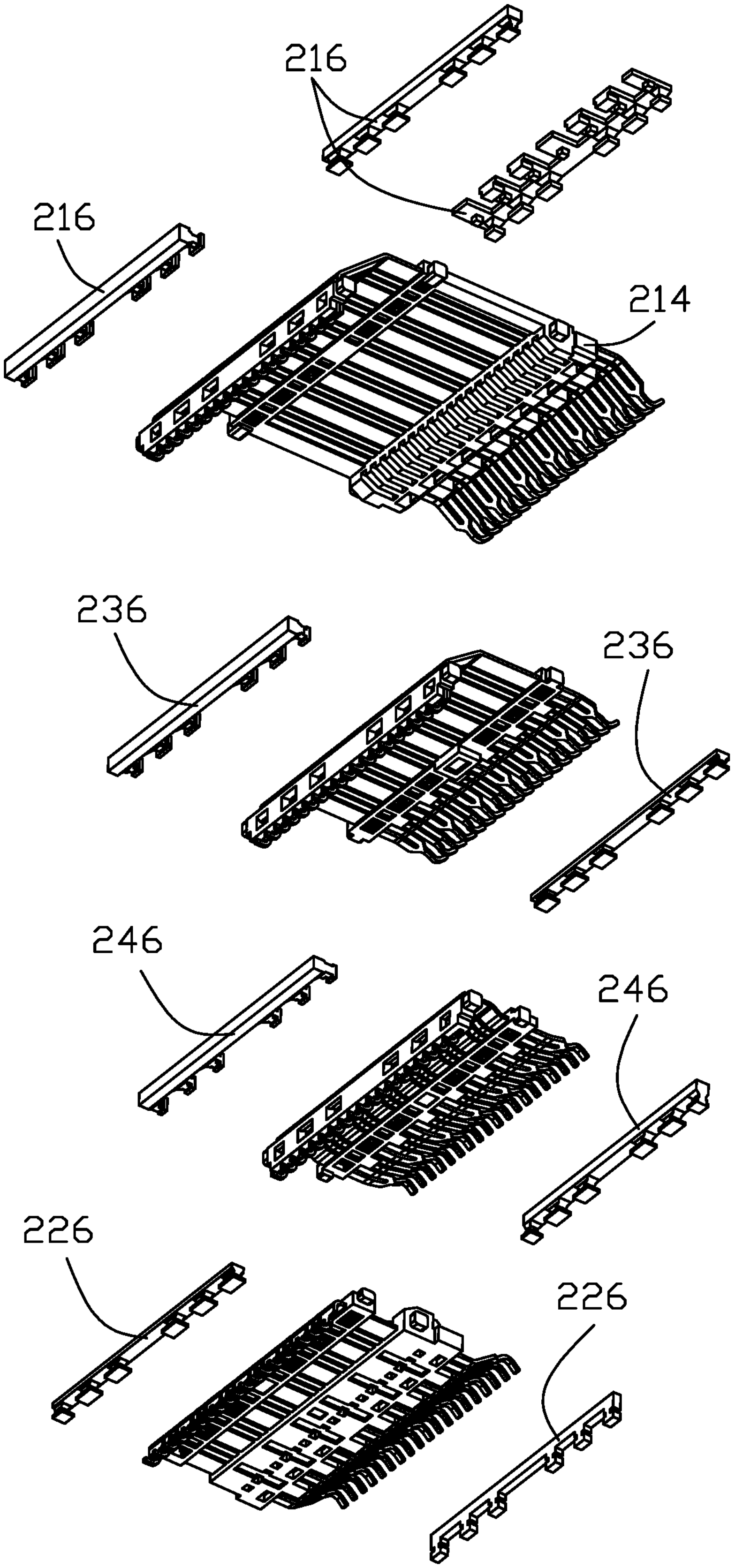
FIG. 13 is another perspective view of the terminal module of FIG. 12.
Figure 14:
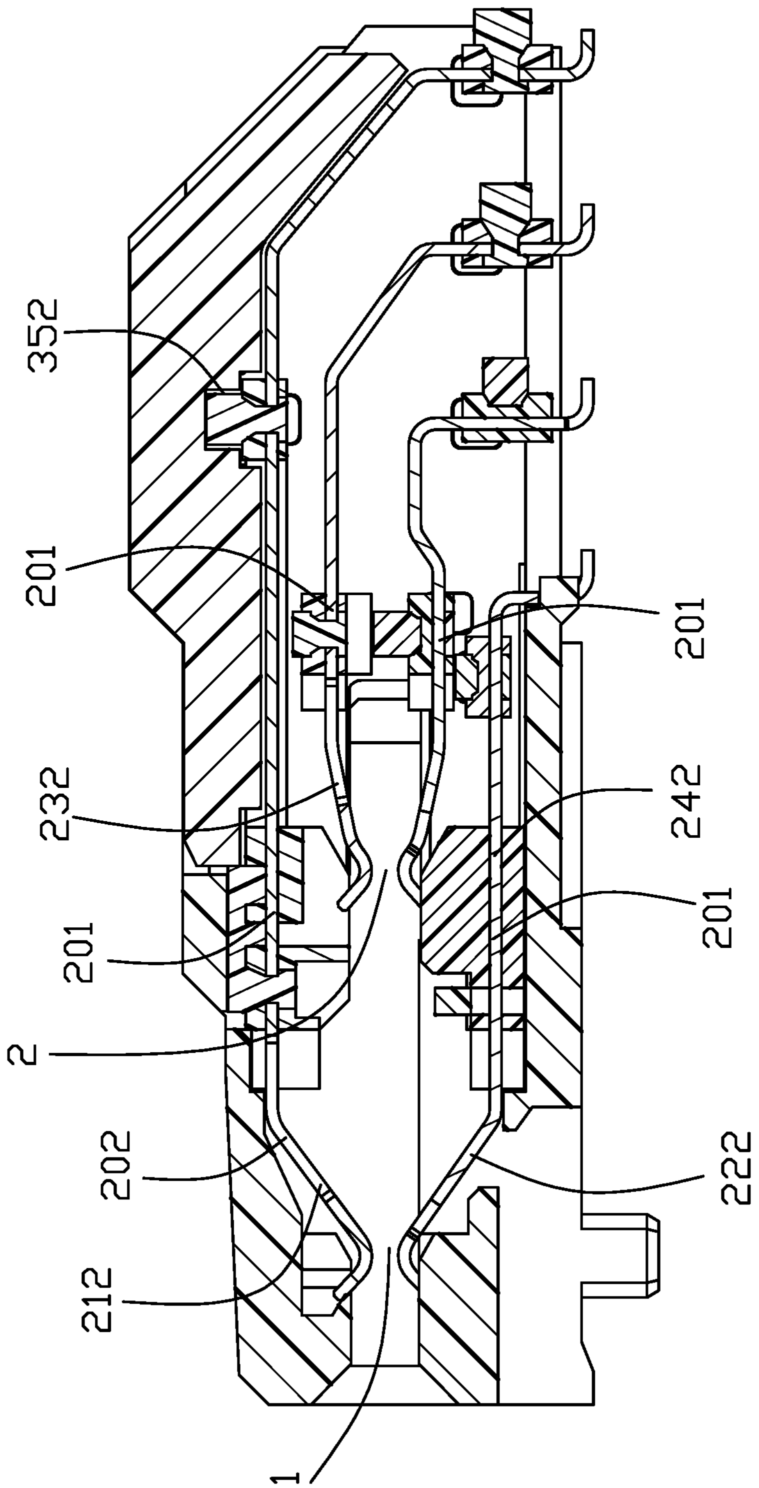
FIG. 14 is a cross-sectional view of the electrical connector of FIG. 1.

Referring to FIGS. 1-14, an electrical connector 100 in accordance with the present invention is shown. The electrical connector 100 can be inserted and matched with a mating connector (not shown) and includes an insulative housing 10 cooperating with an insulative upper cover 30 to commonly receive a terminal module 20 therein.

The terminal module 20 includes a first terminal module 210, a second terminal module 220, a third terminal module 230 and a fourth terminal module 240. The first terminal module 210 and the third terminal module 230 are stacked with each other in the vertical direction. The second terminal module 220 and the fourth terminal module 240 are stacked with each other in the vertical direction.

The first terminal module 210 includes a first row of terminals 212 arranged along the transverse direction integrally formed with a plurality of transversely extending plastic fixing members 215 via insert-molding. Each plastic fixing member 215 includes an insulative primary part 214 and a conductive secondary part 216. Similarly, the second terminal module 220 includes a second row of terminals 222 integrally formed with a plurality of transversely extending plastic fixing members 225 via insert-molding. Each plastic fixing member 225 includes an insulative primary part 224 and a conductive secondary part 226. The third terminal module 230 includes a third row of terminals 232 integrally formed with a plurality of transversely extending plastic fixing members 235 via insert-molding. Each plastic fixing member 235 includes an insulative primary part 234 and a conductive secondary part 236. The fourth terminal module 240 includes a fourth row of terminals 242 integrally formed with a plurality of transversely extending plastic fixing members 245 via insert-molding. Each of said plastic members 245 includes an insulative primary part 244 and a conductive secondary part 246. Each terminal includes a contacting section 271 matched with the mating connector, a tail portion 272 opposite to the contact portion, and a holding portion 273 therebetween. Each row of terminals includes a plurality of differential-pair signal terminals and a plurality of ground terminals alternately arranged with each other in the transverse direction. The ground terminals are further joined together by the corresponding conductive secondary parts. The width of the signal terminal is smaller than the width of the ground terminal.

Each of the terminals includes a covered portion 201 arranged in the corresponding plastic fixing member and a free portion 202 exposed to air, the length of the free portion 202 is longer than that of the covered portion 201. The plastic fixing member 215 has an opening 217 that exposes the corresponding signal terminal to air. Specifically, take the first terminal module 210 as an example, the insulative primary part 214 has an opening 217 that exposes the corresponding signal terminal to air, and the conductive secondary part 216 has a notch 218 aligned with the opening 217. The first row of terminals 212 and the second row of terminals 222 form a first mating port 1, and the third row of terminals 232 and the fourth row of terminals 242 form a second mating port 2. The first mating port 1 and the second mating port 2 are arranged along a front-to-back direction. Because the ground terminal is wider than the signal terminal, the plastic fixing member near the contact portion 271 on the signal terminal extends forward beyond the portion on the ground terminal to increase the contact normal force of the signal terminal. The length of the free portion 202 of at least one of the first row of terminals 212, the second row of terminals 222, the third row of terminals 232, and the fourth row of terminals 242 is at least three times the length of the covered portion 201. Specifically, the length of the free portion 202 of each terminal of the first row is of terminals 212 is at least twice the length of the covered portion 201. The length of the free portion 202 of each terminal of the second row of terminals 222 is at least 1.5 times the length of the covered portion 201. The length of the free portion 202 of each terminal of the third row of terminals 232 is at least three times the length of the covered portion 201. The length of the free portion 202 of each terminal of the fourth row of terminals 242 is at least twice the length of the covered portion 201.

A pair of metallic side plates 40 are located by two opposite sides of the terminal module 20, respectively. The metallic side plate 40 fixes the first terminal module 210, the second terminal module 220, the third terminal module 230 and the fourth terminal module 240 together. Each metallic side plates 40 forms a plurality of holes 402 therein. Correspondingly, each plastic fixing member includes a pair of positioning protrusions 204 at two opposite ends to be received within the corresponding holes 402, respectively, so as to secure the whole terminal module 20 together. The positioning protrusions 204 secured to the metallic side plate 40 by heat riveting.

Each metallic side plate 40 forms a notch 408 is aligned with the contact portion 271 of the terminals of the third row of terminals 232 the fourth row of terminals 242 in the transverse direction. The plastic fixing member 215 of the first terminal module 210 forms a plurality of grooves 2151 for respectively receive the contact portions 271 of the corresponding terminals of the third row of terminals 232. The plastic fixing member 225 of the second terminal module 220 forms a plurality of grooves 2251 to respectively receive the contact portions 271 of the corresponding terminals of the fourth row of terminals 242.

A front region of the insulative hosing 10 forms a mating slot 110, and upper and lower rows of passageways 112 located two sides of the mating slot 110 in the vertical direction wherein the upper row of passageways 112 respectively receive the contact portion 271 of the first row of terminals 212, and the lower passageways 112 respectively receive the contact portion 271 of the second row of terminals 222. The insulative housing 10 includes an upper wall 11, a lower wall 12 and a pair of side walls 13. The upper wall 11 includes a flat horizontal portion 101 at the front and a raised portion 103 at the rear of the horizontal portion 101. An elongated opening 105 is formed between the horizontal portion 101 and the raised portion 103. A rear region of the insulative housing 10 forms a pair of upper channels 113 and a pair of lower channels 114 in two opposite side walls 13. Correspondingly, the positioning protrusions 204 are arranged in upper and lower rows to be respectively received within the upper channels 113 and lower channels 114. Therefore, the assembled terminal module 20 can be inserted into the insulative housing 10 from the rear side forwardly along the front-to-back direction. A pair of stopping blocks 109 is formed on the inner faces of the side walls 13 to be received within the corresponding notches 408 of the corresponding metallic side plate 40.

The insulative upper cover 30 includes a slot 352 extending in the transverse direction to receive one plastic fixing member 215 therein, and a pair of guide ribs 354 received within the upper channel 113, and a protrusion 358 received within the locking space 119 in the upper channel 113. Therefore, the insulative upper cover 30 is combined with the terminal module 20 as a whole, forwards along the front-to-back direction, and are inserted into the insulative housing 10 from the rear side of the insulative housing 10.

The electrical connector 100 of the present invention exposes the signal terminals to air as much as possible to adjust the characteristic impedance of the signal terminals, thereby improving the signal transmission rate of the connector. Moreover, the electrical connector 100 of the present invention fixes the terminal module 20 as a whole through the side plates 40 on the two sides, so that the structure of the electrical connector 100 is more compact, and the assembly is simple and convenient. The electrical connector 100 of the present invention conforms to the specification of QSFP-DD, which defines 8 transmission channels and 8 reception channels, and the signal transmission rate of each channel can reach 100 Gbps. Of course, the present invention can also be applied to high-speed electrical connectors such as SFP-DD, SFP, OSFP, etc.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

an insulative housing;

a first terminal module and a second terminal module arranged vertically in the insulative housing, and a third terminal module and a fourth terminal module arranged vertically in the insulative housing, the first terminal module including a first row of terminals integrally formed with a plurality of plastic fixing members extending in a transverse direction perpendicular to a vertical direction, the second terminal module including a second row of terminals integrally formed with a plurality of transversely extending plastic fixing members via insert-molding, the third terminal module including a third row of terminals integrally formed with a plurality of transversely extending plastic fixing members via insert-molding, the fourth terminal module including a fourth row of terminals integrally formed with a plurality of transversely extending plastic fixing members via insert-molding, each terminal defining a contact portion matched with a mating connector, a tail portion opposite to the contact portion, and a holding portion therebetween; and a pair of metallic side plates fixing the four terminal modules together, each metallic side plates having a plurality of holes, each plastic fixing member including a pair of positioning protrusions at two ends thereof in the transverse direction to be received within corresponding holes, respectively; wherein the positioning protrusions respectively extend through the corresponding holes and are heat riveted to the metallic side plates.

2. The electrical connector as claimed in claim 1, wherein each of the four rows of terminals includes a covered portion held in corresponding plastic fixing members and a free portion exposed to air, a length of the free portion of at least one terminal of the first row of terminals, the second row of terminals, the third row of terminals, and the fourth row of terminals is at least three times a length of an associated covered portion.

3. The electrical connector as claimed in claim 2, wherein the first row of terminals and the second row of terminals form a first mating port, and the third row of terminals and the fourth row of terminals form a second mating port, and the first mating port and the second mating port are arranged along a front-to-back direction.

4. The electrical connector as claimed in claim 2, wherein the length of the free portion of each terminal of the third row of terminals is at least three times the length of the covered portion.

5. The electrical connector as claimed in claim 2, wherein the length of the free portion of each terminal of the first row of terminals is at least twice the length of the covered portion, the length of the free portion of each terminal of the second row of terminals is at least twice the length of the covered portion, and the length of the free portion of each terminal of the fourth row of terminals is at least twice the length of the covered portion.

6. The electrical connector as claimed in claim 2, wherein each row of terminals includes plural pairs of signal terminals capable of transmitting differential signals and plural ground terminals alternately arranged with the plural pairs of signal terminals, each of the ground terminals is wider than each of signal terminals of the plural pair of signal terminals, a portion of the plastic fixing member near the contact portion on the signal terminal extends forward beyond an another portion of the plastic fixing member near the contact portion on the ground terminal to increase the contact normal force of the signal terminal.

7. The electrical connector as claimed in claim 6, wherein each plastic fixing member includes an insulative primary part and a conductive secondary part, the conductive secondary part mechanically and electrically connects corresponding ground terminals together.

8. The electrical connector as claimed in claim 7, wherein the plastic fixing member has an opening that exposes a corresponding signal terminal to air.

9. The electrical connector as claimed in claim 8, wherein the insulative primary part has an opening that exposes the corresponding signal terminal to air, and the conductive secondary part has a notch aligned with the opening.

10. The electrical connector as claimed in claim 1, wherein a rear region of the insulative housing forms a pair of upper channels and a pair of lower channels in two opposite side walls thereof, and the positioning protrusions are arranged in upper and lower rows to be respectively received within the upper channels and lower channels.

11. The electrical connector as claimed in claim 1, further comprising an insulative upper cover including a slot extending in the transverse direction to receive one plastic fixing member therein, and wherein the insulative upper cover and the terminal modules are inserted into the insulative housing from the rear side of the insulative housing.

12. The electrical connector as claimed in claim 1, wherein the insulative housing includes an upper wall, a lower wall, and a pair of side walls, the upper wall includes a flat horizontal portion at the front and a raised portion at the rear of the flat horizontal portion, and an elongated opening is formed between the horizontal portion and the raised portion.

* * * * *